United States Patent [19]
Sanders

[11] 3,717,125
[45] Feb. 20, 1973

[54] AUTOMATIC FEEDER FOR FISH AQUARIUM

[76] Inventor: Howard E. Sanders, 3 Kiswick Lane, Hampton, Va. 23369

[22] Filed: Nov. 30, 1970

[21] Appl. No.: 93,744

[52] U.S. Cl..............................................119/51.11
[51] Int. Cl..............................................A01k 61/02
[58] Field of Search....................119/51, 51.11, 56, 5

[56] References Cited

UNITED STATES PATENTS

| 3,029,790 | 4/1962 | Loudon | 119/51.11 |
| 2,772,659 | 12/1956 | Tennis | 119/51.11 X |
| 3,031,109 | 4/1962 | Krag | 119/51.11 X |

FOREIGN PATENTS OR APPLICATIONS 673,806  11/1963  Canada

Primary Examiner—Hugh R. Chamblee
Attorney—Cushman, Darby & Cushman

[57] ABSTRACT

A piston having a slot of variable length is mounted in a horizontal cylinder and caused to pass slowly under a hopper where the slot is filled with fish food, then slowly over the aquarium to dispense the fish food. The piston makes e.g. one round trip per day. Lighting for the aquarium may be keyed to the piston movement to establish periods when the aquarium is lighted. The piston is shaped to minimize the build up of fish food between the bottom of the piston and cylinder.

9 Claims, 4 Drawing Figures

INVENTOR
Howard E. Sanders
BY Cushman, Darby & Cushman
ATTORNEYS

INVENTOR
Howard E. Sanders

AUTOMATIC FEEDER FOR FISH AQUARIUM

BACKGROUND OF THE INVENTION

Many electro-mechanical fish feeding devices have been designed, but few appear to have been put into production or marketed widely. Examples of ones which have been patented are shown in the following U.S. patents.

| | | |
|---|---|---|
| 2,725,852 | C.H. Cramer | Dec. 6, 1955 |
| 2,772,659 | F.H. Tennis | Dec. 4, 1956 |
| 2,785,831 | S. Smolin | Mar. 19, 1957 |
| 2,793,791 | C.A. Clark | May 28, 1957 |
| 2,808,808 | E.C.J. Roben | Oct. 8, 1957 |
| 2,847,066 | J.P. Kleiber et al. | Aug. 12, 1958 |
| 2,858,799 | A. Krauss et al. | Nov. 4, 1958 |
| 2,978,148 | B.M. Schwartz | Apr. 4, 1961 |
| 3,050,029 | A.I. Appleton | Aug. 21, 1962 |
| 3,113,556 | J.G. Jarvis | Dec. 10, 1963 |

Di Nuzzo, U.S. Pat. No. 2,800,256, shows a feeder having a sliding rectangular piston 13 which also vibrates. A timer operates a solenoid to cause sliding of the piston back and forth. Apparently, the piston is indexed several times a day.

SUMMARY OF THE INVENTION

A piston having a slot of variable length is mounted in a horizontal cylinder and caused to pass slowly under a hopper where the slot is filled with fish food, then slowly over the aquarium to dispense the fish food. The piston makes e.g. one round trip per day. Lighting for the aquarium may be keyed to the piston movement to establish periods when the aquarium is lighted. The piston is shaped to minimize the build up of fish food between the bottom of the piston and cylinder.

With respect to the presently preferred embodiment of the invention, the following characteristics are seen as being advantageous.

1. The fish are fed automatically both as to time and volume.
2. The two-part piston design in which the void between the two parts of the piston can be varied in volume to permit accomodation with the feeding requirements of any particular aquarium's population.
3. The two-layer cam which operates the light switch permits positioning the cams at various rotations from one another to provide an adjustable on-off ratio for the light.
4. The sliding action of the piston within the cylinder provides the advantage that only the amount of food which has been measured under the hopper and transported to the opening over the aquarium can enter the aquarium.
5. The use of a jogger to vibrate the hopper-piston-cylinder assembly, makes gravity feed of pulverized food effectively possible.
6. The configuration of the main piston which has a recessed top surface to eliminate jamming and a raked bottom surface to move stray food toward the outlet is believed to be novel also.

DETAILS OF THE PRESENTLY PREFERRED EMBODIMENT

Figure 1:
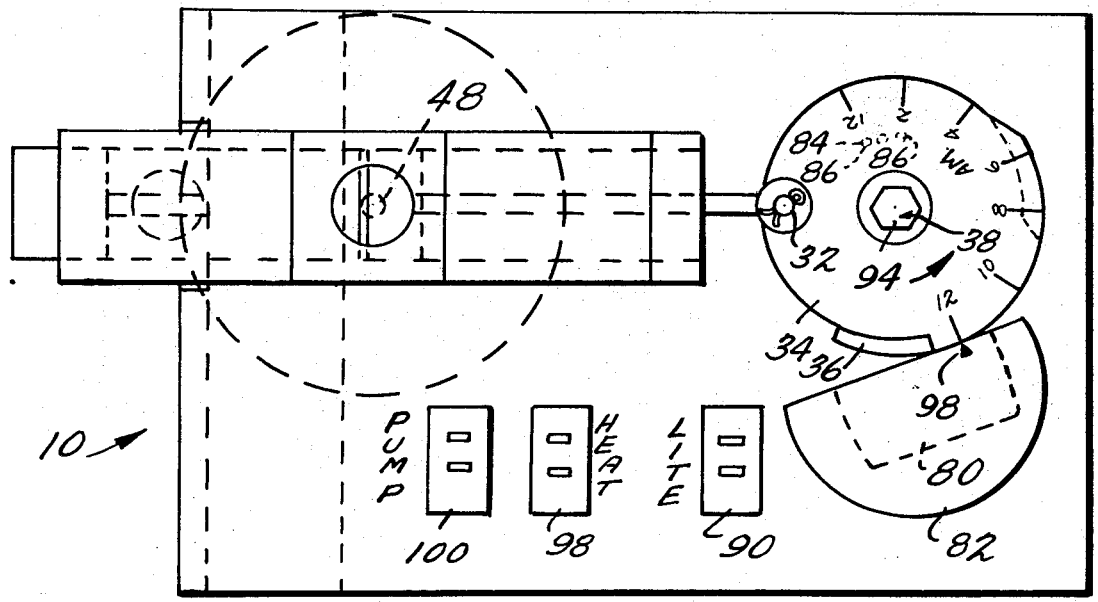
FIG. 1 is a top plan view of the presently preferred embodiment of the device with the hopper sectioned away along the line 1—1 of FIG. 2 to expose details it would have obstructed.

The electro-mechanical device 10 is designed for use with tropical fish aquariums A to accomplish the following functions:

I. Deliver to the aquarium A a selectable predetermined volume of dry fish food F commencing at a predetermined time each day and continuing for a period of several hours.

II. Switch an aquarium hood light on at a preselected time each day, maintain the light on for an adjustable predetermined period of time, and switch it off at the end of that interval.

III. Provide convenient unswitched receptacles for the attachment of other aquarium appliances such as heaters and filter-aeration pumps which must operate continuously 24 hours each day.

Functions I and II are powered by the same one-revolution-per-day synchronous electric (timing) motor 12.

Function I is accomplished as follows: Through the operation at a two-part piston 14 and connecting rod assembly 16 in a long horizontal cylinder 18 an adjustable opening or void 20 axially between the two piston parts 22, 24 is made to pass alternately under an "IN" opening 26 in the top of the cylinder and an "OUT" opening 28 in the bottom of the cylinder 18 at a point axially displaced from the opening 28. While the void is under the IN opening, hopper 30 dispenses sufficient dry food F to fill the volume-adjustable void 20. Hours later when the void begins to become positioned over the OUT opening 28, the food begins to drop through that opening onto the water of the aquarium A. Horizontal spacing between the In and OUT openings is sufficiently great that no food can pass directly from the hopper to the aquarium without being measured and transported. Food continues to drop for several hours until the void is completely vertically aligned with the OUT opening and empty. The piston 14 is driven by its solidly-attached connecting rod 16 connected to a crank pin 32 on the upper of two stacked flat cams 34, 36 which are driven on a common vertical axle 38 by the one-revolution-per-day synchronous electric motor 12 attached to the under side of the device housing 40 top wall 42. Because the main piston 22 is attached solidly e.g. integrally to the connecting rod, the piston-cylinder-hopper assembly 44 oscillates leftwardly and rightwardly about a pivot 48 located near the center of a jogger 50 (to be discussed later) attached to the cylinder 18.

The two portions of the piston are interconnected by an exteriorly threaded, axially extending shank 49 received in correspondingly internally threaded sockets in the facing, axially spaced ends of the two piston portions. Manual rotation of the shank 49 increases or decreases the volume of the space confined between the two piston portions when the piston portions are within the cylinder. The dimensioning of the piston portions and cylinder are such that the piston may slide in the cylinder. Of course, with a sacrifice of versatility the piston could be made of one piece with a vertical hole through it intermediate its two ends to provide a fixed volume void. As a variation of the one-piece piston. Various thickness annular inserts could be removably mounted in the vertical hole to reduce the size of the void for instances where the volume of the entire hole would be too great for the amount of food needed for the fish in the particular aquarium.

Figure 2:
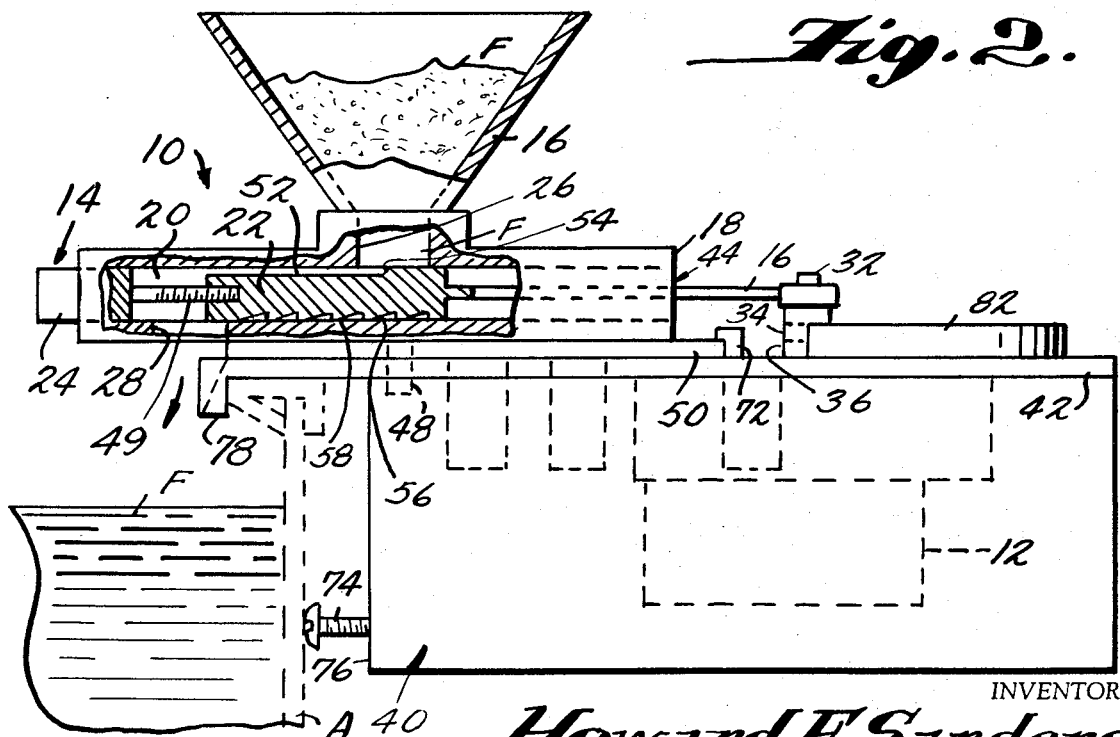
FIG. 2 is a side elevation view of the device of FIG. 1, with piston and cylinder portions longitudinally, vertically sectioned along line 2—2 of FIG. 1.

The main portion 22 of the two-part piston 14 deserves special discussion. As depicted, it is rectangular in transverse cross-section. It has two additional features which enhance its performance. FIG. 2 shows the complete piston in longitudinal section. Note that the top surface 52 of the main piston is thinned down on the end opposite the connecting rod 16. This prevents jamming when the piston tries to shear food grains which could become lodged between the main piston and the IN hole 26 as the piston is extending toward the OUT hole 28. A short distance before the connecting rod base, the main piston resumes full height at 54. In addition, the lower surface 56 of the main piston is raked in the direction of travel of the piston from the IN opening, toward the OUT opening toward the feed position. There is a tendency for the tiniest food particles to get under the piston during operation. The teeth 58 of the rake bottom tend to roll over these particles during the retraction stroke, then move them forward toward the aquarium during the next extension stroke.

Figure 3:
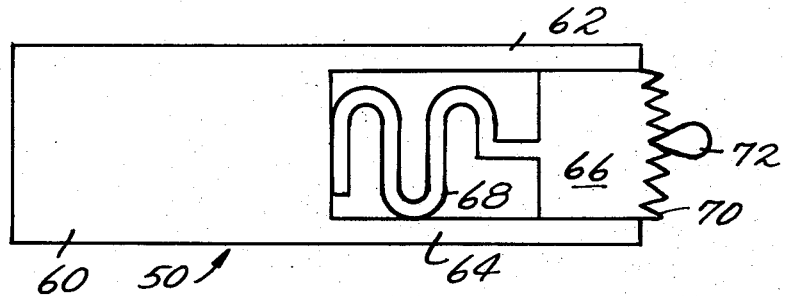
FIG. 3 is a top plan view of the jogger mechanism for the feeder.
Figure 4:
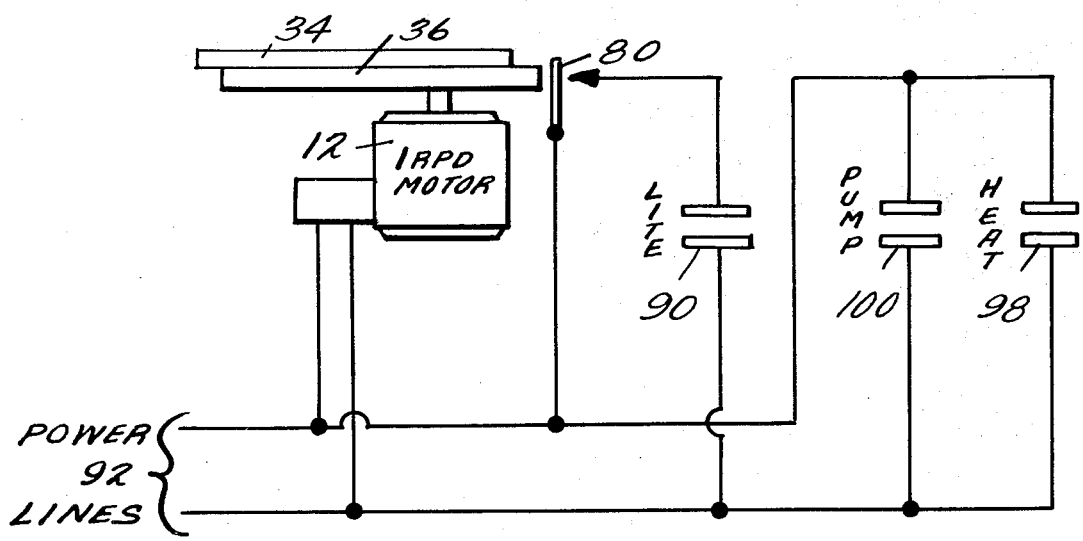
FIG. 4 is a typical schematic wiring diagram for the entire feeding device.

Dry tropical fish food is available in various sizes from larger pellets (approx. one-sixteenth inch diameter which can be used as received) to pulverized grains having the consistency of finely milled flour. Larger sized particles will easily flow through the assembly from hopper to aquarium. This is not always true of pulverized food which tends to cohere. In order to make such food fall by gravity to fill the void or drop from the void to the aquarium, a vibrator or jogger 50 so is used. Such a jogger is solidly attached to the under side of the cylinder 18. Referring to FIG. 3 in which the jogger is shown separately, portion 60 is seen to be solid on the left end which is attached to the cylinder, and forked on the other and so as to have two laterally spaced, longitudinally disected legs 62,64. The fork acts as a guide to allow jogger portion 66 received between the legs to operate back and forth along the long dimension, but restricts sidewise motion. Portion 66 is loaded by a flat compression spring 68 to keep its teeth 70 spaced along its rear edge engaged with fixed pin 72 which is attached to the upper surface of the top wall of the main housing 40. In operation, the teeth 70 are in a position to click past the fixed pin 72 during those periods when the void is either under the IN opening or over the OUT opening. As each tooth passes the pin it produces a sharp vibration (jog) in the hopper-cylinder-piston assembly 44 due to some flexibility of the connecting rod and causes pulverized food to fall either into or out of the void. This action insures complete filling or emptying of the void as appropriate during the cycle.

The feeding operation takes place once each day. The device does not dump the entire measure of food at once, but begins with a light flow as the void begins to become positioned over the OUT opening. Flow gradually continues for several hours, first increasing and then decreasing until the void is empty. The food is thus made available during a rather long period. Fish do not normally eat "meals" such as dogs do – they nibble bits here and there. The action of the feeding achieved by the feeder is thus quite natural.

Of course, if preferred, a motor which makes e.g. two revolutions a day could be used to establishing e.g. two spaced, long feeding periods. Also a motor which revolves faster could be used, together with suitable reduction gearing for the cam-turning shaft.

The feeder 10 may be attached to the side of the aquarium A as shown in FIG. 2. A screw 74 threads into the side of the base 76 of the housing and provides an adjustment for levelling the feeder on any aquarium regardless of the side frame and glass thickness. The feeder hangs outboard of the aquarium as shown. The OUT opening is over the water, or at least over a chute 78 on the housing top wall, the chute being aimed to drop its load onto the water.

Function II is accomplished by the action of the stacked pair of cams 34, 36 on a snap action switch 80 mounted under a hood 82 on the upper surface of the housing. The cams are attached directly to the shaft 38 of the 1 revolution-per-day motor 12. The cams 34 and 36 are almost identical to one another. The upper cam 34 has the crank pin which drives the piston, as mentioned earlier. In addition, it has a small indexing pin 84 on its under side which engages any one of a plurality of detents 86 in the lower cam 36. The detents 86 in the example illustrated are spaced 15° apart so that adjacent holes provide 1-hour variations in light "ON" time. By selectively angularly positioning the upper cam with respect to the lower cam, varying durations of cam angular travel can be selected to operate the switch 80 which is in series with one lead of the "LITE" receptacle 90 across the power line 92. Each cam lobe is about half the thickness of the switch plunger so that the lobe of either cam will hold the switch closed.

Referring to FIG. 1, note that the upper cam is marked into 30° (2-hour) sectors. Only AM (morning) marks are shown in the Figure for clarity. To set the feeder into operation or reset following a power outage, the motor shaft nut 94 is loosened and the cams are rotated counter clockwise until the pointer 96 on the hood 82 aligns with the time of day.

Function III is a convenience feature. While the hood light which plugs into the socket 90 is needed for only a few hours per day, the filteraeration pump and the water heater are required full time and need no switch. Rather than plug the feeder unit, a light, a pump, and a heater into remote wall receptacles, use of HEAT and PUMP receptacles 98, 100 on the feeder allows a more orderly arrangement of exposed wiring. Only the feeder unit needs a wall receptacle; all other devices plug into it. A mess of unsightly wiring is eliminated.

It should now be apparent that the Automatic Feeder For Fish Aquarium as described hereinabove posseses each of the attributes set forth in the specification under the heading "Summary of the Invention" hereinbefore. Because the Automatic Feeder For Fish Aquarium of the invention can be modified to some extent without departing from the principles of the invention as they have been outlined and explained in this specification, the present invention should be understood as encompassing all such modifications as are within the spirit and scope of the following claims.

I claim:

1. An electromechanical device for automatically feeding aquarium fish comprising:
    a generally horizontal conduit;
    means defining an inlet of said conduit;
    a fish food hopper positioned over said conduit at one location and adapted to dispense fluent fish food into said conduit through said inlet;
    said conduit having a portion, displaced axially downstream from said one location, adapted to be disposed over the water of an aquarium;
    means defining an outlet of said conduit at said position;
    a piston slidingly received in said conduit and having a face which faces downstream;
    means for slowly advancing said piston from a fully retracted position wherein said piston face lies upstream of said conduit inlet, to a fully extended position wherein said piston face lies adjacent said conduit outlet, and for retracting said piston from said fully extended position to said fully retracted position;
    surface means on said piston configured and arranged to present flow of fish food from said hopper into said conduit after said piston face has passed said conduit inlet in travelling toward said conduit outlet and until said piston face has reached said conduit inlet in travelling away from said conduit outlet;
    said means for slowly advancing the piston and for retracting it comprising:
    an electric motor having a vertically extending output shaft;
    crank arm means mounted on said shaft and extending laterally, horizontally therefrom;
    a piston rod connected to said piston and extending axially therefrom;
    means pivotally connecting the distal end of the crank arm to the distal end of the piston rod; and said device further including housing means; and
    means pivotally mounting said conduit on said housing means for pivotal oscillation about a generally vertical axis, the oscillation being induced by rotation of said crank arm.

2. The device of claim 1 wherein said motor is a continuously operating, 1-revolution-per-day synchronous motor.

3. The device of claim 1 further comprising jogger means which includes: a pin member and a serrated member having a plurality of serrations in a line positioned to be relatively traversed by the pin member;
    one of said pin member and said serrated member being stationarily mounted on said housing and the other of said pin member and said serrated member being mounted with respect to said conduit for oscillation therewith; whereby, as said conduit oscillates, the serrations are jogged by the pin member thus producing vibrations which even the flow of the fluent fish food into and from said conduit.

4. The device of claim 3 wherein the means pivotally mounting the conduit on the housing means comprises a jogger plate having a depending pivot axle; said conduit being mounted on said jogger plate;
    said jogger plate further including two laterally spaced, axially extending horizontal arms;
    said serrated member being received between said arms for limited axial travel laterally restricted and guided by said arms;
    and spring means mounted on the jogger plate between the arms and disposed to urge the serrated member outwardly of the arms to ensure interfering contact between the serrations and the pin member.

5. The device of claim 1 wherein the crank arm is constituted by a cam disk having means defining a cam track on the outer periphery thereof;
    an electric light circuit for an aquarium light
    said electric light circuit incorporating a switch having an actuator disposed for running contact with said cam track, whereby the electric light circuit may be alternated between an "ON" condition and an "OFF" condition in coordination with travelling of said piston.

6. The device of claim 5 further including a second cam disk having means defining a cam track on the outer periphery thereof;
    the second cam disk being mounted on the output shaft of said motor axially adjacent the first-mentioned cam disk;
    the cam track of the second cam disk also being disposed for running contact with said switch actuator;
    detent means defined on the first-mentioned and second cam disks and disposed to permit selection of and holding of any of a plurality of relative angular positions of said first-mentioned and second cam disks, whereby the durations of the "ON" and "OFF" conditions of the electric light circuit may be adjusted.

7. An electromechanical device for automatically feeding aquarium fish comprising:
    a generally horizontal conduit;
    means defining an inlet of said conduit;
    a fish food hopper positioned over said conduit at one location and adapted to dispense fluent fish food into said conduit through said inlet;
    said conduit having a portion, displaced axially downstream from said one location, adapted to be disposed over the water of an aquarium;
    means defining an outlet of said conduit at said position;
    a piston slidingly received in said conduit and having a face which faces downstream;
    means for slowly advancing said piston from a fully retracted position wherein said piston face lies upstream of said conduit inlet, to a fully extended position wherein said piston face lies adjacent said conduit outlet, and for retracting said piston from said fully extended position to said fully retracted position;
    surface means on said piston configured and arranged to present flow of fish food from said hopper into said conduit after said piston face has passed said conduit inlet in travelling toward said conduit outlet and until said piston face has reached said conduit inlet in travelling away from said conduit outlet;

the conduit being constituted by a cylinder of rectangular internal transverse cross-sectional shape, said piston likewise having a generally rectangular transverse cross-sectional shape;

the inlet of said conduit being constituted by means defining a vertically upwardly directed opening in the top of the cylinder;

the outlet of said conduit being constituted by means defining a vertically downwardly directed opening in the bottom of the cylinder;

means defining a raked bottom surface on said piston having raking thereon oriented to slide over grains of fluent fish food during retraction of the piston and to urge said grains forwardly when the piston is advancing; and means defining a stepped upper surface on said piston so that said piston is of lesser thickness near said face.

8. The device of claim 7 wherein said piston further includes an auxiliary portion spaced downstream from said face thereof; and means connecting the auxiliary portion to the piston to define a gap between the piston and the auxiliary portion for receipt of fluent fish food from said hopper.

9. The device of claim 8 wherein the connecting means comprises a threaded shank, threadably received in means defining on internally threaded socket in each of said piston and said auxiliary portion whereby the volume of said gap may be adjusted by rotation of said threaded shank.

* * * * *